(12) United States Patent
Zhao et al.

(10) Patent No.: US 10,558,868 B2
(45) Date of Patent: Feb. 11, 2020

(54) METHOD AND APPARATUS FOR EVALUATING A VEHICLE TRAVEL SURFACE

(71) Applicant: GM GLOBAL TECHNOLOGY OPERATIONS LLC, Detroit, MI (US)

(72) Inventors: Qingrong Zhao, Madison Heights, MI (US); Jinsong Wang, Troy, MI (US); Bakhtiar B. Litkouhi, Washington, MI (US); Jingfu Jin, Troy, MI (US); Tianyu Wang, Bellevue, WA (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 15/845,381

(22) Filed: Dec. 18, 2017

(65) Prior Publication Data

US 2019/0188495 A1     Jun. 20, 2019

(51) Int. Cl.
*G06K 9/00* (2006.01)
*G06K 9/62* (2006.01)
(Continued)

(52) U.S. Cl.
CPC ......... *G06K 9/00798* (2013.01); *B60W 30/12* (2013.01); *B60W 30/14* (2013.01);
(Continued)

(58) Field of Classification Search
CPC .... G06K 9/00798; G06K 9/4604; G06K 9/66; G06K 9/6267; G06K 9/6202;
(Continued)

(56) References Cited

U.S. PATENT DOCUMENTS

2009/0138805 A1\* 5/2009 Hildreth ............. G06K 9/00335
715/745
2012/0134576 A1\* 5/2012 Sharma ................ G06K 9/4604
382/155
(Continued)

OTHER PUBLICATIONS

Shibata, Takeuch, Kawai, Horita; "Detection of Road Surface Conditions in winter using Road Surveillance Cameras at Daytime, Night-time and Twilight"; IJCSNS, vol. 14, No. 11, pp. 22-24, Nov. 2014.

*Primary Examiner* — Joseph Suh
(74) *Attorney, Agent, or Firm* — Quinn IP Law (57) ABSTRACT

A vehicle includes a plurality of on-vehicle cameras, and a controller executes a method to evaluate a travel surface by capturing images for fields of view of the respective cameras. Corresponding regions of interest for the images are identified, wherein each of the regions of interest is associated with the portion of the field of view of the respective camera that includes the travel surface. Portions of the images are extracted, wherein each extracted portion is associated with the region of interest in the portion of the field of view of the respective camera that includes the travel surface and wherein one extracted portion of the respective image includes the sky. The extracted portions of the images are compiled into a composite image datafile, and an image analysis of the composite image datafile is executed to determine a travel surface state. The travel surface state is communicated to another controller.

17 Claims, 5 Drawing Sheets

(51) Int. Cl.
*G06K 9/66* (2006.01)
*G06T 7/11* (2017.01)
*G05D 1/02* (2006.01)
*B60W 30/14* (2006.01)
*B60W 30/12* (2006.01)
*G06K 9/46* (2006.01)

(52) U.S. Cl.
CPC ......... *G05D 1/0246* (2013.01); *G06K 9/4604* (2013.01); *G06K 9/6202* (2013.01); *G06K 9/627* (2013.01); *G06K 9/6267* (2013.01); *G06K 9/66* (2013.01); *G06T 7/11* (2017.01); *B60W 2420/42* (2013.01); *B60W 2550/14* (2013.01); *B60W 2710/18* (2013.01); *B60W 2710/20* (2013.01); *B60W 2720/106* (2013.01); *G05D 2201/0213* (2013.01); *G06T 2207/20132* (2013.01)

(58) Field of Classification Search
CPC .. B60W 30/12; B60W 30/14; B60W 2710/18; B60W 2550/14; B60W 2420/42; B60W 2720/106; B60W 2710/20; G05D 1/0246; G05D 2201/0213; G06T 7/11; G06T 2207/20132

See application file for complete search history.

(56) References Cited

U.S. PATENT DOCUMENTS

| | | | | |
|---|---|---|---|---|
| 2012/0147187 | A1* | 6/2012 | Li | G06K 9/3233 348/148 |
| 2012/0287282 | A1* | 11/2012 | Kinoshita | B60R 1/00 348/148 |
| 2013/0325323 | A1* | 12/2013 | Breed | G01C 21/3667 701/420 |
| 2014/0257595 | A1* | 9/2014 | Tillmann | G01C 11/02 701/2 |
| 2015/0049193 | A1* | 2/2015 | Gupta | G03B 43/00 348/148 |
| 2018/0113434 | A1* | 4/2018 | Shapiro | G05B 19/406 |
| 2018/0253839 | A1* | 9/2018 | Zur | A61B 1/00009 |
| 2018/0348749 | A1* | 12/2018 | Lavoie | G06K 9/00664 |

* cited by examiner

METHOD AND APPARATUS FOR EVALUATING A VEHICLE TRAVEL SURFACE

INTRODUCTION

Vehicle control systems may benefit from information related to conditions of a travel surface, and may employ such information as an input for controlling one or more systems such as braking, cornering and acceleration. Differing conditions of the road surface may affect coefficient of friction between the tires and the road surface. Dry road surface conditions provide a high coefficient of friction, whereas snow covered road conditions provide a lower coefficient of friction. It is therefore desirable for the vehicle to be able to determine the current condition of the road surface.

SUMMARY

A vehicle including a plurality of on-vehicle cameras is described. A method for evaluating a travel surface for a vehicle includes capturing, via the on-vehicle cameras, a plurality of images associated with a plurality of fields of view (FOVs) of the respective cameras, wherein at least a portion of each of the fields of view includes the travel surface. Corresponding regions of interest for the images are identified, wherein each of the regions of interest is associated with the portion of the field of view (FOV) of the respective camera that includes the travel surface. Portions of the images are extracted, wherein each extracted portion of the respective image is associated with the region of interest in the portion of the field of view of the respective camera that includes a portion of the travel surface. The extracting portions of the images are compiled into a composite image datafile, and an image analysis of the composite image datafile is executed to determine a travel surface state. The travel surface state is communicated to an on-vehicle controller.

An aspect of the disclosure includes the composite image datafile being a composite image that includes the travel surface surrounding the vehicle.

Another aspect of the disclosure includes the composite image that includes the travel surface that surrounds the vehicle includes a first portion associated with the travel surface at the front of the vehicle, a second portion associated with the travel surface at the rear of the vehicle, a third portion associated with the travel surface at a left side of the vehicle and a fourth portion associated with the travel surface at a right side of the vehicle.

Another aspect of the disclosure includes determining that the travel surface includes one of a dry state, a wet state, an iced state and a snow-covered state.

Another aspect of the disclosure includes comparing results of the image analysis of the composite image datafile with a plurality of surface conditions that are captured in a road surface pattern database, and classifying the travel surface state based upon the comparison.

Another aspect of the disclosure includes capturing a plurality of image files, wherein each of the image files includes a digital representation of the entire FOV of the respective on-vehicle camera at its original resolution.

Another aspect of the disclosure includes a portion of each of the fields of view including the travel surface.

Another aspect of the disclosure includes extracting portions of the images by cropping the respective image to include the portion of the field of view of the respective camera that includes the travel surface.

Another aspect of the disclosure includes extracting portions of the images by scaling, rotating and compressing the region of interest of the respective image in the portion of the field of view of the respective camera that includes the travel surface.

Another aspect of the disclosure includes simultaneously capturing the plurality of images.

Another aspect of the disclosure includes a method for evaluating a travel surface for a vehicle that includes capturing, via an on-vehicle camera, an image associated with a field of view of the respective camera, wherein at least a portion of the field of view includes the travel surface, and identifying a plurality of regions of interest for the image, wherein each of the regions of interest is associated with the portion of the field of view of the respective camera that includes the travel surface.

Another aspect of the disclosure includes a method for evaluating a travel surface for a vehicle that includes capturing, via an on-vehicle camera, an image associated with a field of view of the camera, wherein the field of view includes the travel surface and a surrounding environment. A plurality of regions of interest for the image are identified, wherein the regions of interest are associated with the portion of the field of view of the camera that includes the travel surface and the surrounding environment. An image analysis of the image is executed, and a travel surface state is determined based upon the image analysis of the image. The travel surface state is communicated to an on-vehicle controller.

Another aspect of the disclosure includes extracting portions of the image, wherein one of the portions of the image is associated with the region of interest in the portion of the field of view of the camera that includes the travel surface, and wherein one of the portions of the image includes the surrounding environment. The extracted portions of the image are compiled into a composite image datafile, and subjected to an image analysis routine. A travel surface state is determined based upon the image analysis of the composite image datafile, and communicated to an on-vehicle controller.

Another aspect of the disclosure includes executing a deep neural network analysis of the composite image datafile.

Another aspect of the disclosure includes the field of view further including the sky, wherein the regions of interest associated with the portion of the field of view of the camera further include the sky, and wherein extracting portions of the image including extracting the sky to provide an indication of ambient lighting.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure as claimed, but is merely representative of possible embodiments thereof In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
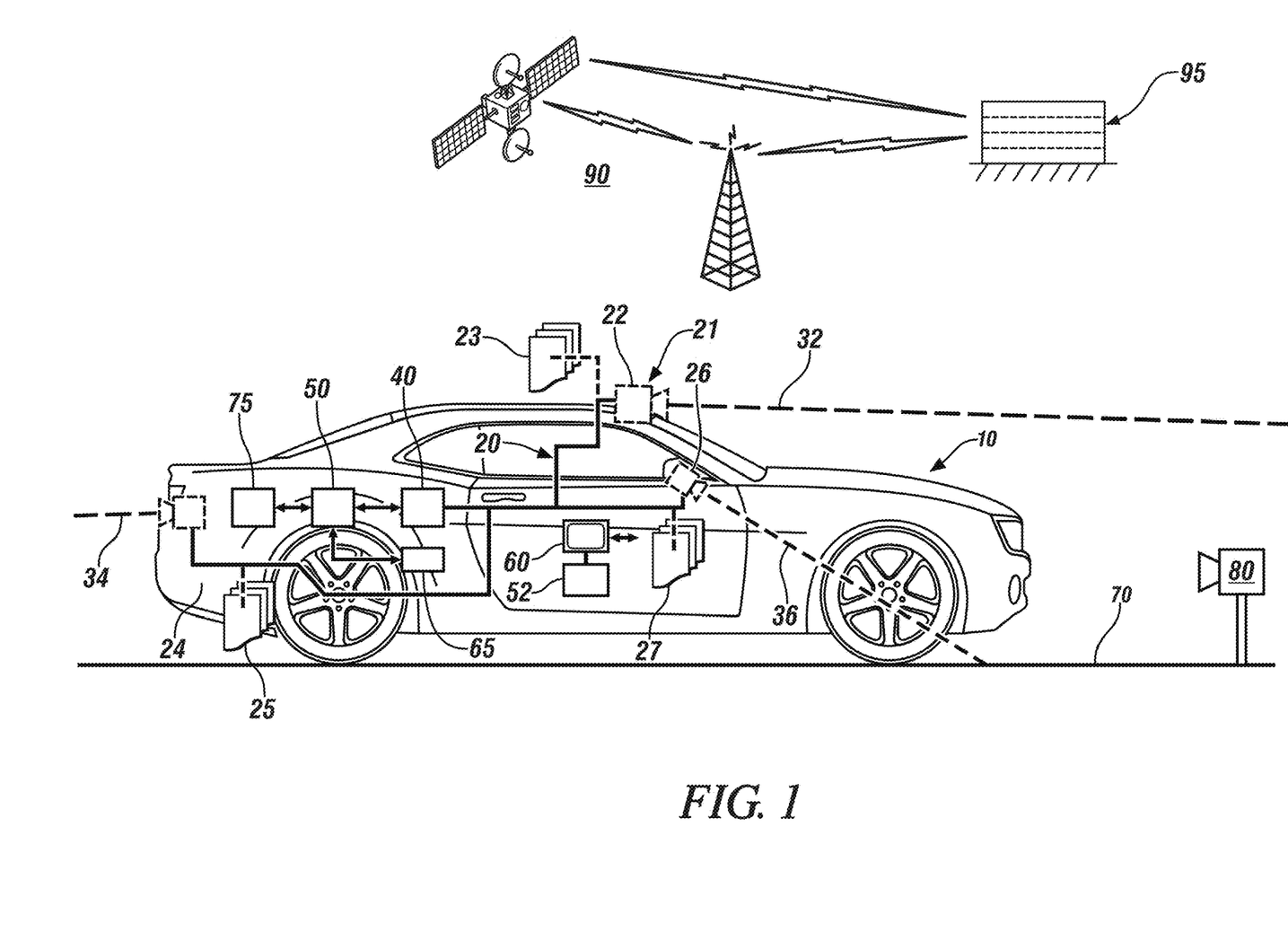
FIG. 1 schematically illustrates a side-view of a vehicle including an on-vehicle vision system, wherein the vehicle is disposed on a travel surface, in accordance with the disclosure.

Referring to the drawings, wherein like reference numerals correspond to like or similar components throughout the several Figures, FIG. 1, consistent with embodiments disclosed herein, schematically illustrates a side-view of a vehicle 10 including an on-vehicle vision system 20, wherein the vehicle 10 is disposed on and able to traverse a travel surface 70 such as a paved road surface. The vehicle 10 may be equipped with an autonomous controller 65 that implements autonomous vehicle functionalities in one embodiment. The vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The autonomous controller 65 is configured to effect autonomous vehicle operation. Autonomous vehicle functionality may include an on-vehicle control system that is capable of providing a level of driving automation. The terms 'driver' and 'operator' describe the person responsible for directing operation of the vehicle 10, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle 10. Driving automation can include some level of automatic control or intervention related to simultaneous control of multiple vehicle functions, such as steering, acceleration, and/or braking, with the driver continuously having overall control of the vehicle 10. Driving automation can include simultaneous automatic control of vehicle driving functions that include steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle 10 for an entire trip. Driving automation includes hardware and controllers configured to monitor the spatial environment under various driving modes to perform various driving tasks during dynamic vehicle operation. Driving automation can include, by way of non-limiting examples, cruise control, adaptive cruise control, lane-change warning, intervention and control, automatic parking, acceleration, braking, and the like. The autonomous vehicle functions include, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. As such, the braking command can be generated by the autonomous controller 65 independently from an action by the vehicle operator and in response to an autonomous control function.

Operator controls can be included in the passenger compartment of the vehicle 10 and may include, by way of non-limiting examples, a steering wheel, an accelerator pedal, the brake pedal and an operator input device that is an element of the HMI device 60. The operator controls enable a vehicle operator to interact with and direct operation of the vehicle 10 in functioning to provide passenger transportation. The operator control devices including the steering wheel, accelerator pedal, brake pedal, transmission range selector and the like may be omitted in some embodiments of the vehicle 10.

The HMI device 60 provides for human/machine interaction, for purposes of directing operation of an infotainment system, a global position sensor (GPS) 52, a navigation system and the like, and includes a controller. The HMI device 60 monitors operator requests and provides information to the operator including status of vehicle systems, service and maintenance information. The HMI device 60 communicates with and/or controls operation of a plurality of operator interface devices, wherein the operator interface devices are capable of transmitting a message associated with operation of one of the autonomic vehicle control systems. The HMI device 60 may also communicate with one or more devices that monitor biometric data associated with the vehicle operator, including, e.g., eye gaze location, posture, and head position tracking, among others. The HMI device 60 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI device 60. The HUD may project information that is reflected onto an interior side of a windshield of the vehicle, in the field of view of the operator, including transmitting a confidence level associated with operating one of the autonomic vehicle control systems. The HUD may also provide augmented reality information, such as lane location, vehicle path, directional and/or navigational information, and the like.

The vision system 20 is composed of a plurality of image detectors (cameras) 21 that are in communication with a camera controller 40. The cameras 21 are advantageously mounted and positioned on the vehicle 10 in locations that permit capturing images of fields-of-view (FOVs), wherein at least a portion of each of the FOVs includes an aspect of the travel surface 70. At least one of the FOVs includes a surrounding environment, including, e.g., vehicle traffic, roadside objects and other features, the sky and a horizon. The sky and horizon provide an indication of ambient lighting. The environmental objects such as traffic or road side objects can project mirror images on wet surfaces that can help travel surface identification As shown, there are three cameras 21, including a first camera 22, a second camera 24 and a third camera 26. In one embodiment, the first camera 22 can be disposed on a forward portion of the vehicle 10 to monitor a first FOV 32 that is in front of the vehicle 10, thus capturing images that include the lane of travel and on-coming traffic forward of the vehicle 10. In one embodiment, the second camera 24 can be disposed on a rear portion of the vehicle 10 to monitor a second FOV 34 that is rearward of the vehicle 10, thus capturing images that include the lane of travel and, traffic that is behind the vehicle 10. In one embodiment, the third camera 26 can be disposed on a side portion of the vehicle 10 to monitor a third FOV 36 that is on one of the right or left sides of the vehicle 10, thus capturing images that include one side-view of the vehicle 10. In one embodiment, a fourth camera (not shown) can be disposed on the other of the right or left sides of the vehicle 10 to monitor another FOV that includes the other side-view of the vehicle 10. Other cameras 21 may be disposed elsewhere on the vehicle 10, and one or more of the first camera 22, the second camera 24 and the third camera 26 may be configured to monitor multiple FOVs employing lens configurations such as a fisheye lens, or employing rotating or pivoting arrangements. As appreciated, the quantity of the cameras 21 disposed on-vehicle to monitor frontward, rearward and side FOVs is selectable.

In one embodiment, as described with reference to FIG. 7, the vision system 20 may be composed of one image detector (camera) 21 that is in communication with the camera controller 40, and has a FOV that includes the travel surface, the surrounding environment, including, e.g., vehicle traffic, roadside objects and other features, and the sky. The sky provides an indication of ambient lighting.

The cameras 21 may be configured to include features such as a pin-hole lens, a fisheye lens, a stereo lens, an infrared detector, etc. Each of the cameras 21 includes an image acquisition sensor that is capable of capturing, processing and electronically storing image files of the associated FOV, and communicating the image files to the camera controller 40 for storage and analysis. As shown, there is a first image file 23 associated with the first FOV 32, a second image file 25 associated with the second FOV 34, and a third image file 27 associated with the third FOV 36. The image files may be periodically captured as a desired rate, e.g., 30 files per second.

Each of the image files is a digital representation of the respective FOV that is captured at an original resolution of the camera 21. In one embodiment, each of the image files is in the form of a 24-bit stereo image including RGB (red-green-blue) visible light spectrum values and depth values that represent the associated FOV. Other embodiments of the image file can include either a 2D or 3D image at some level of resolution depicting a black-and-white or a grayscale visible light spectrum representation of the respective FOV, an infrared spectrum representation of the respective FOV, or other image representations without limitation. The image representations of the image files can be evaluated for parameters related to brightness and/or luminance in one embodiment. Alternatively, the image representations may be evaluated based upon RGB color components, texture, contour, or combinations thereof. The image acquisition sensor communicates with an encoder, which executes digital signal processing (DSP) on the respective image file. The image acquisition sensor of each of the cameras 21 may be configured to capture the respective image at a nominally standard-definition resolution, e.g., 640×480 pixels. Alternatively, the image acquisition sensor of the cameras 21 may be configured to capture the respective image at a nominally high-definition resolution, e.g., 1440×1024 pixels, or at another suitable resolution. The image acquisition sensors of the cameras 21 may capture still images, or alternatively, digital video images at a predetermined rate of image capture. The image files are communicated to the camera controller 40 as encoded datafiles that are stored in a non-transitory digital data storage medium in one embodiment for on-board or off-board analysis.

The vehicle 10 includes a telematics controller 75, which includes a wireless telematics communication system capable of extra-vehicle communications, including communicating with a communication network system 90 having wireless and wired communication capabilities. The telematics controller 75 is capable of extra-vehicle communications that includes short-range vehicle-to-vehicle (V2V) communication and/or vehicle-to-infrastructure (V2x) communication, which may include communication with an infrastructure monitor 80, e.g., a traffic camera. Alternatively or in addition, the telematics controller 75 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller 75, and the handheld device executes the extra-vehicle communication, including communicating with an off-board controller 95 via the communication network 90. Alternatively or in addition, the telematics controller 75executes the extra-vehicle communication directly by communicating with the off-board controller 95 via the communication network 90.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The camera controller 40 and other on-vehicle controllers can be deployed to evaluate the travel surface 70 of the vehicle 10 by simultaneously capturing and analyzing image files from the cameras 21 that include some portion of the travel surface 70 and also capture the ambient lighting, such as may be provided through an image of the sky. The image files are associated with the plurality of FOVs of the cameras 21 wherein at least a portion of each of the plurality of FOVs includes some portion of the travel surface 70.

Input images may be generated for analysis by a travel surface identification process 100. One image, examples of which are shown with reference to FIGS. 4, 5, 6, includes images from a plurality of the on-vehicle cameras 21 having different FOVs. A second image, an example of which is shown with reference to FIG. 7, includes portions of an image from one of the on-vehicle cameras 21 that is positioned to have a FOV that is in front of the vehicle 10.

Figure 2:
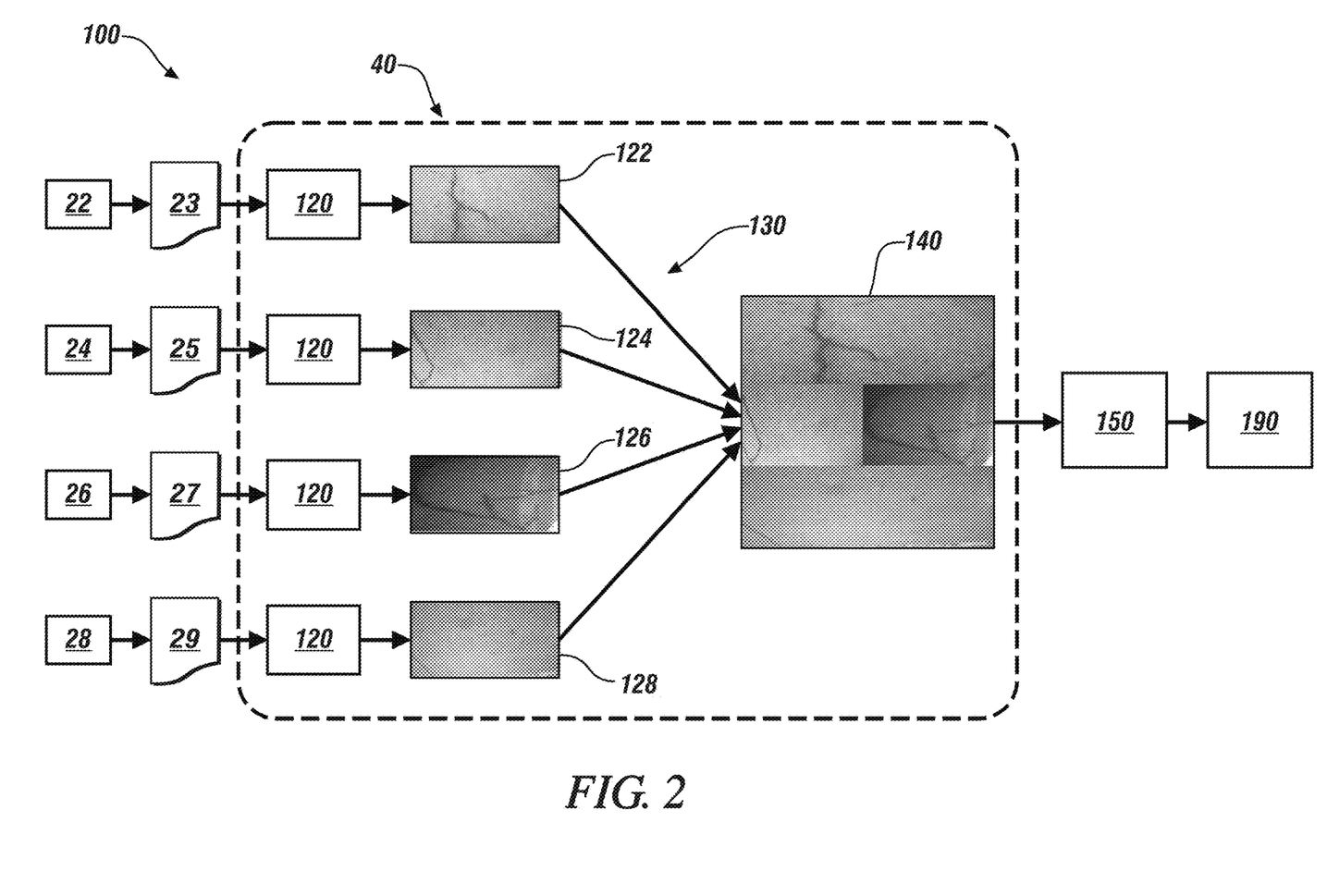
FIG. 2 schematically shows details of a travel surface identification process for classifying a vehicle travel surface based upon images from a plurality of on-vehicle cameras, in accordance with the disclosure.

FIG. 2 schematically shows details of a travel surface identification process 100 that can be implemented on an embodiment of the vehicle 10 that is described with reference to FIG. 1. The travel surface identification process 100 is executable in the camera controller 40 to classify the travel surface 70 on which the vehicle 10 is travelling based upon images from the plurality of cameras 21, wherein the images from the on-vehicle cameras 21 have different FOVs. The plurality of cameras 21 includes the first, second, and third cameras 22, 24, 26 and an nth camera 28, wherein the nth camera 28 indicates a desired quantity of on-vehicle cameras. The first, second, third and nth cameras 22, 24, 26, 28 capture and generate respective image files 23, 25, 27, 29 that are communicated to the camera controller 40. The image files 23, 25, 27, 29 are individually subjected to an extraction process 120 that includes identifying a region of interest that is associated with a portion of the FOV of the respective camera that includes the travel surface 70, and extracting a cropped datafile. The cropped datafiles are associated with the respective region of interest in the FOV of the respective first, second, third and nth cameras 22, 24, 26, 28 that includes the travel surface 70 and a portion of the ambient environment including the sky for discerning ambient lighting, and are shown as respective cropped images 122, 124, 126 and 128. The cropped images 122, 124, 126 and 128 are compiled via step 130 into a composite image datafile 140 for processing, and the composite image datafile 140 is subjected to an image analysis process 150 to classify the condition of the travel surface 70, and determine a travel surface state 190. An alternative embodiment of the travel surface identification process 100 can be executed in the camera controller 40 to classify the travel surface 70 on which the vehicle 10 is travelling based upon an image from a single one of the cameras 21, e.g., the first camera 22, which captures an image of the FOV in the front of the vehicle 10.

Figure 3:
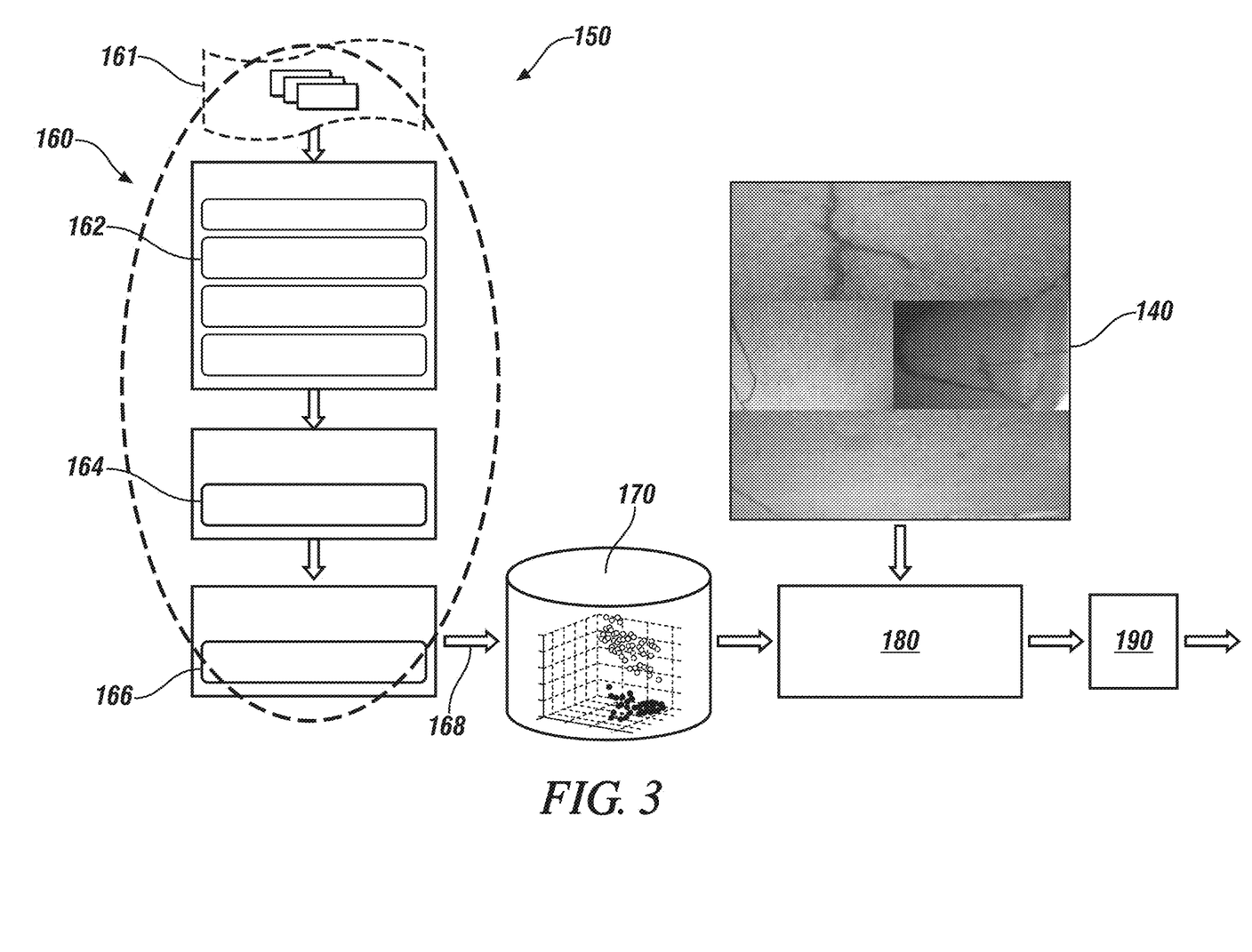
FIG. 3 schematically shows an embodiment of an image analysis process for classifying the condition of a vehicle travel surface to determine a travel surface state, including a training process and an image analysis step, in accordance with the disclosure.

FIG. 3 schematically shows one embodiment of the image analysis process 150 for classifying the condition of the travel surface 70 to determine the travel surface state 190. The image analysis process 150 includes a training process 160 and an image analysis step 180, wherein the image analysis step 180 evaluates the composite image datafile 140 to determine the travel surface state 190. The image analysis process 150 may be based upon one or a combination of RGB, grayscale, black/white, spectrum analysis.

The training process 160 may be executed off-line, with results stored in a memory device in the controller 40 in the vehicle 10, or alternatively stored in a memory device at a remote site such as the off-board controller 95.

The image analysis process 150 is one illustration of an image analysis process that is based on image processing that includes hand-crafted feature analysis approach, which may include manually extracting features, then training of classifiers separately based on machine learning. Alternatively, a deep learning approach unifies the feature extraction process and the classification step through several layers of neural network. During execution of the training process 160, the parameters of the neural network will be learned, and then in real time the real time image is fed into the trained neural network. Offline training and online analysis are based on a common approach that includes training to learn the unknown parameters, with the online analysis executed to feed images into the parameter-learned approach for classification.

The training process 160 includes employing machine learning tools such as an artificial neural network (ANN), or a convolutional neural network (ConvNet) deep learning analysis, or another analytical process. The training process 160 includes collecting a plurality of training images 161 employing one or a plurality of cameras that can be configured similar to the first, second, third and nth cameras 22, 24, 26, 28 that are described herein. The training images 161 are image files that include images of the travel surface 70 that exhibit a single surface condition that is homogeneous in appearance. Surface conditions can include a dry travel surface, a wet travel surface, an ice-covered surface, a snow-covered surface, etc. The training images 161 are subjected to steps that include preprocessing 162, feature extraction 164 and classifier construction 166 to generate a road surface pattern database 170. The preprocessing step 162 includes steps of noise removal and extraction of one or more regions of interest that are representative of and correspond to the respective surface condition. Datafiles are captured that are extracted portions of the image files captured and recorded by the camera 21. The feature extraction step 164 includes executing statistical analysis, template matching, color/brightness analysis, etc. on the data contained in the extracted portions of the image files to identify patterns in the data that correlate to the respective surface condition. The results of the feature extraction step 164 are input to the classifier construction step 166, which generates a classifier 168 associated with the respective surface condition that may be captured in a road surface pattern database 170. The road surface pattern database 170 is stored on-vehicle as a calibration file, or stored off-vehicle at a remote site for interrogation by the vehicle.

The image analysis step 180 operates during vehicle operation, and includes evaluating the composite image datafile 140 in view of the road surface pattern database 170 to determine, in real-time, the travel surface state 190.

The image analysis step 180 can classify the travel surface 70 based upon the composite image datafile 140 employing machine learning tools such as a smart vector machine, artificial neural network (ANN), or a convolutional neural network (ConvNet) deep learning analysis, or another analytical process. The image analysis step 180 and the training process 160 employ the same machine learning tools. The output generated by the image analysis step 180 is the travel surface state 190, which can be, by way of non-limiting examples, a dry state, a wet state, an ice state, or a snow-covered state. The travel surface state 190 may be communicated to the vehicle controller 50, which may employ the travel surface state 190 in vehicle dynamic control related to acceleration, braking and cornering. The travel surface state 190 may also be communicated to the vehicle operator via a human-machine interface (HMI) device 60. The travel surface state 190 may also be communicated to the telematics controller 75 for short-range vehicle-to-vehicle (V2V) communication, communication to an intelligent highway system, or communication to another extra-vehicle system.

The training process 160 includes collecting a plurality of training images 161 employing one or a plurality of cameras that can be configured similar to the first, second, third and nth cameras 22, 24, 26, 28 that are described herein. The training images 161 are image files that include images of the travel surface 70 that exhibit a single surface condition that is homogeneous in appearance. Surface conditions can include a dry travel surface, a wet travel surface, a snow-covered surface, etc. The training images 161 are subjected to steps that include preprocessing 162, feature extraction 164 and classifier construction 166 to generate a road surface pattern database 170. The preprocessing step 162 includes steps of noise removal and extraction of one or more regions of interest that are representative of and correspond to the respective surface condition. Datafiles are captured that are extracted portions of the image files captured and recorded by the camera 21. The feature extraction step 164 includes executing statistical analysis, etc. on the data contained in the extracted portions of the image files to identify patterns in the data that correlate to the respective surface condition. The results of the feature extraction step 164 are input to the classifier construction step 166, which generates a classifier 168 associated with the respective surface condition that may captured in a road surface pattern database 170. The road surface pattern database 170 is stored on-vehicle as a calibration file, or stored off-vehicle at a remote site for interrogation by the vehicle.

Figure 4:
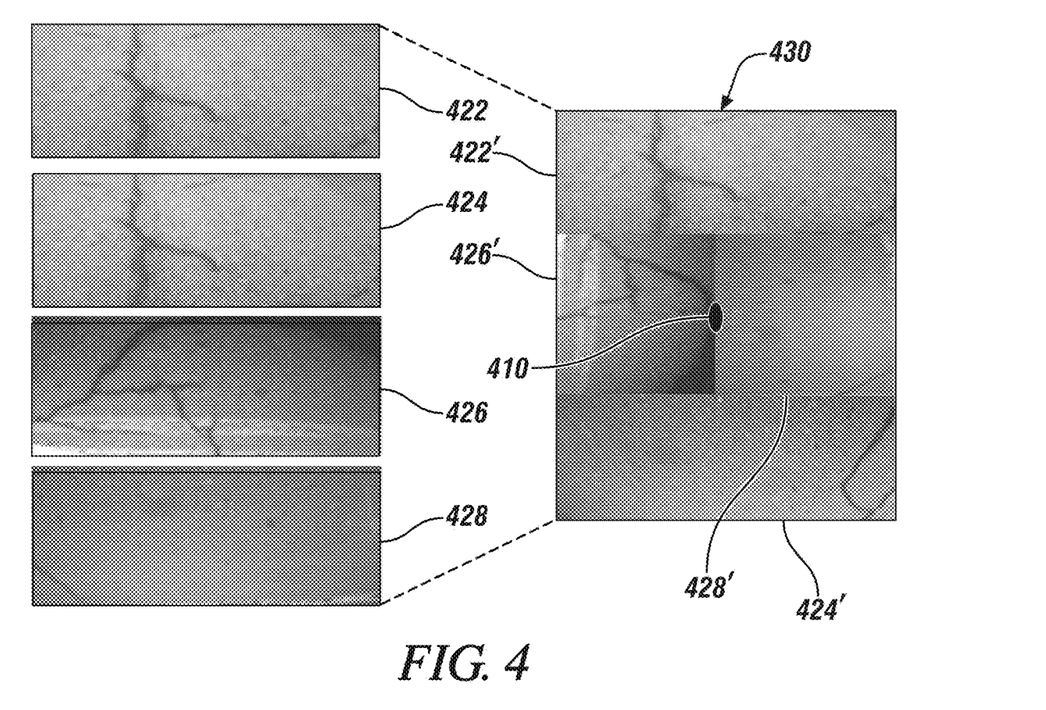
FIG. 4 illustrates an embodiment of the composite image datafile described with reference to FIG. 2, including a plurality of regions of interest associated with portions of FOVs of the cameras that include the vehicle travel surface, and depicts the vehicle travel surface in a dry state, in accordance with the disclosure.

FIG. 4 pictorially illustrates a first embodiment of images associated with the travel surface identification process 100 that is described with reference to FIGS. 2 and 3 and is executed on the vehicle 10 described with reference to FIG. 1. The travel surface identification process 100 includes compiling the composite image datafile by extracting, cropping, rotating and compressing portions of images that include the travel surface as captured by the plurality of on-vehicle cameras. As shown the composite image is indicated by element 430, and includes images of a plurality of regions of interest associated with portions of FOVs of the plurality of cameras that includes the travel surface and can be generated from a plurality of simultaneously captured images that capture the different FOVs. The travel surface in FIG. 4 is in a dry state. A first image 422 can be captured by one of the cameras having a forward FOV, a second image 424 can be captured by one of the cameras having a rearward FOV, a third image 426 can be captured by one of the cameras 21 having a left-side FOV and a fourth image 428 can be captured by one of the cameras 21 having a right-side FOV.

The simultaneously-captured first, second, third and fourth images 422, 424, 426 and 428 can be cropped, rotated, scaled and assembled into the composite image 430 that depicts a view of the travel surface 70 that completely surrounds the vehicle 10. Cropping includes removing portions of the respective image that do not include the travel surface, such as removing an oncoming vehicle from the forward FOV that may be captured by the first image 422 or removing another vehicle from the rearward FOV that may be captured by the second image 424. Rotating includes changing orientation of the respective image, such as a 90° counter-clockwise rotation of the fourth image 428 showing the right-side FOV and a 90° clockwise rotation of the third image 426 showing the left-side FOV. Scaling can include compressing or expanding one or more of the first, second, third and fourth images 422, 424, 426 and 428. Assembling includes coupling the resulting images, depicted as first, second, third and fourth images 422', 424', 426' and 428' that may have been cropped, rotated and/or scaled in a manner that depicts a view of the travel surface 70 that surrounds the vehicle 10, which is represented as having a locus 410 as shown in the composite image 430. The processes of cropping, rotating and scaling to form the first, second, third and fourth images 422', 424', 426' and 428' that are compiled into the composite image 430 are executed on respective datafiles for the first, second, third and fourth images 422, 424,

426 and 428, and may include removing selecting pixels, averaging pixels and other forms of pixel data manipulation.

FIG. 4 depicts the travel surface 70 in a dry state, and the third image 426 as captured has a low level of luminance and/or brightness, which may have been caused by a shadow. Under certain conditions, the third image 426 may be incorrectly interpreted with the travel surface 70 being in a wet state. However, the image analysis step 180 of the travel surface identification process 100 that is described with reference to FIGS. 2 and 3 can be advantageously executed to evaluate the composite image datafile that is associated with the composite image 430 to determine, in real-time, that the travel surface state 190 is indeed a dry state by evaluating the first, second, third and fourth images 422', 424', 426' and 428'.

Figure 5:
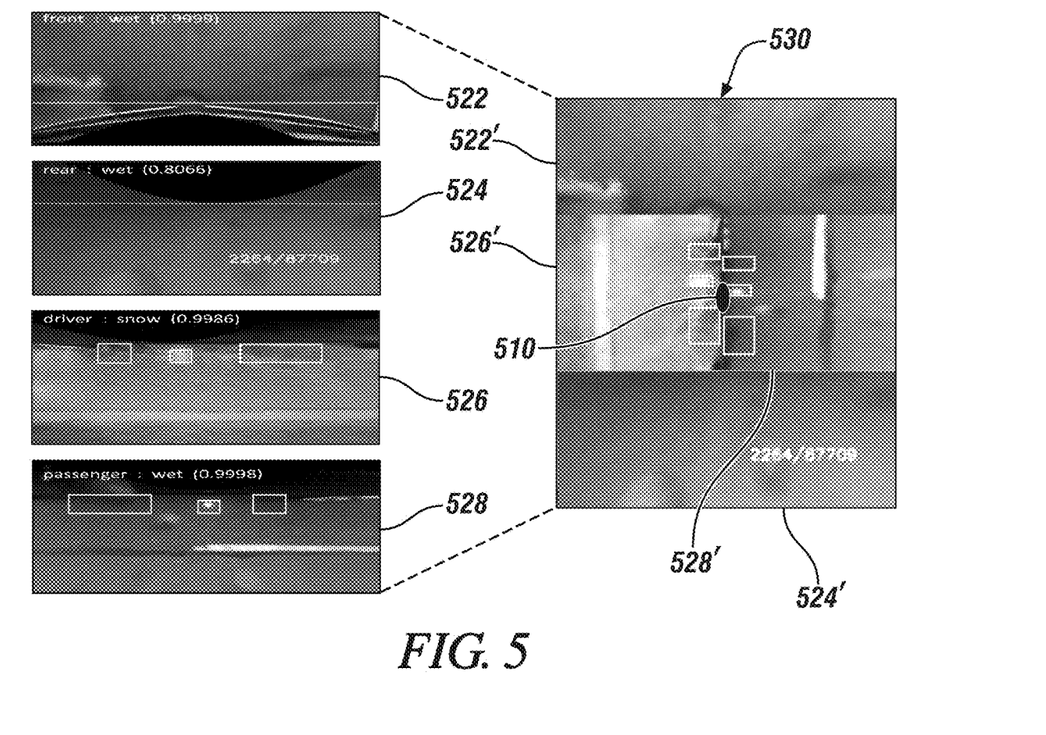
FIG. 5 illustrates an embodiment of the composite image datafile described with reference to FIG. 2, including a plurality of regions of interest associated with portions of FOVs of the cameras that include the vehicle travel surface, and depicts the vehicle travel surface in a wet state, in accordance with the disclosure.

FIG. 5 pictorially illustrates a second embodiment of images associated with the travel surface identification process 100 that is described with reference to FIGS. 2 and 3 and is executed on the vehicle 10 described with reference to FIG. 1. The travel surface identification process 100 includes compiling the composite image datafile by extracting, cropping, rotating and compressing portions of images that include the travel surface as captured by the plurality of on-vehicle cameras. As shown the composite image is indicated by element 530, and includes a plurality of regions of interest associated with portions of FOVs of the plurality of cameras that includes the travel surface and can be generated from a plurality of simultaneously captured images that capture the different FOVs. The travel surface in FIG. 5 is in a wet state.

A first image 522 can be captured by one of the cameras having a forward FOV, a second image 524 can be captured by one of the cameras having a rearward FOV, a third image 526 can be captured by one of the cameras 21 having a left-side FOV and a fourth image 528 can be captured by one of the cameras 21 having a right-side FOV.

The simultaneously-captured first, second, third and fourth images 522, 524, 526 and 528 can be cropped, rotated, scaled and assembled into the composite image 530 that depicts a view of the travel surface 70 that surrounds the vehicle 10. Assembling includes coupling the resulting images, depicted as first, second, third and fourth images 522', 524', 526' and 528' that may have been cropped, rotated and/or scaled in a manner that depicts a view of the travel surface 70 that surrounds the vehicle 10, which is represented as having a locus 510 as shown in the composite image 530. The processes of cropping, rotating and scaling to form the first, second, third and fourth images 522', 524', 526' and 528' that are compiled into the composite image 530 are executed on respective datafiles for the first, second, third and fourth images 522, 524, 526 and 528 and may include removing selecting pixels, averaging pixels and other forms of pixel data manipulation.

FIG. 5 depicts the travel surface 70 in a wet state, and the third image 526 as captured has a high level of luminance and/or brightness, which may have been caused by lighting differences. Under certain conditions, the third image 526 may be incorrectly interpreted with the travel surface 70 being in a snow-covered surface. However, the image analysis step 180 of the travel surface identification process 100 that is described with reference to FIGS. 2 and 3 can be advantageously executed to evaluate the composite image datafile that is associated with the composite image 530 to determine, in real-time, that the travel surface state 190 is indeed a wet state by evaluating the first, second, third and fourth images 522', 524', 526' and 528'.

Figure 6:
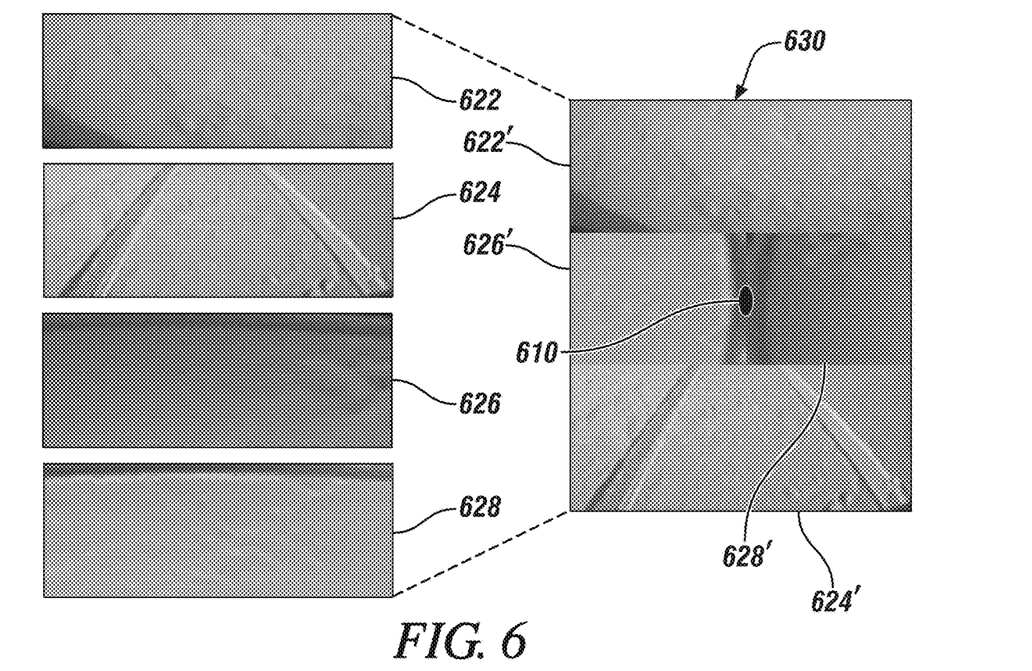
FIG. 6 illustrates an embodiment of the composite image datafile described with reference to FIG. 2, including a plurality of regions of interest associated with portions of FOVs of the cameras that include the vehicle travel surface, and depicts the vehicle travel surface in a snow-covered state, in accordance with the disclosure.

FIG. 6 pictorially illustrates a third embodiment of images associated with the travel surface identification process 100 that is described with reference to FIGS. 2 and 3 and is executed on the vehicle 10 described with reference to FIG. 1. The travel surface identification process 100 includes compiling the composite image datafile by extracting, cropping, rotating and compressing portions of images that include the travel surface as captured by the plurality of on-vehicle cameras. As shown the composite image is indicated by element 630, and includes a plurality of regions of interest associated with portions of FOVs of the plurality of cameras that includes the travel surface and can be generated from a plurality of simultaneously captured images that capture the different FOVs. The travel surface in FIG. 6 is in a snow-covered state. A first image 622 can be captured by one of the cameras 21 having a forward FOV, a second image 624 can be captured by one of the cameras 21 having a rearward FOV, a third image 626 can be captured by one of the cameras 21 having a left-side FOV and a fourth image 628 can be captured by one of the cameras 21 having a right-side FOV.

The simultaneously-captured first, second, third and fourth images 622, 624, 626 and 628 can be cropped, rotated, scaled and assembled into the composite image 630 that depicts a view of the travel surface 70 that surrounds the vehicle 10. Assembling includes coupling the resulting images, depicted as first, second, third and fourth images 622', 624', 626' and 628' that may have been cropped, rotated and/or scaled in a manner that depicts a view of the travel surface 70 that surrounds the vehicle 10, which is represented as having a locus 610 as shown in the composite image 630. The processes of cropping, rotating, scaling and assembling the first, second, third and fourth images 622', 624', 626' and 628' into the composite image 630 are executed on respective datafiles for the first, second, third and fourth images 622, 624, 626 and 628, and may include removing selecting pixels, averaging pixels and other forms of pixel data manipulation.

FIG. 6 depicts the travel surface 70 in a snow-covered state. The third image 626 has a low level of luminance and/or brightness, which may have been caused by lighting or other differences. Under certain conditions, the third image 626 may be incorrectly interpreted with the travel surface 70 being in a dry surface. However, the image analysis step 180 of the travel surface identification process 100 that is described with reference to FIGS. 2 and 3 can be advantageously executed to evaluate the composite image datafile that is associated with the composite image 630 to determine, in real-time, that the travel surface state 190 is indeed a snow-covered state by evaluating the first, second, third and fourth images 622', 624', 626' and 628'. When the vehicle travels on fresh snow, the front camera image, i.e., the first image 622 shows no tire tracks and has a low level of luminance. It may be classified as a dry surface. But two side images, i.e., second and third images 624 and 626, and the rear image 628 show the tire tracks generated by the vehicle. Combining four images depicts a new pattern that is present on fresh snow, which assists in detecting fresh snow.

Figure 7:
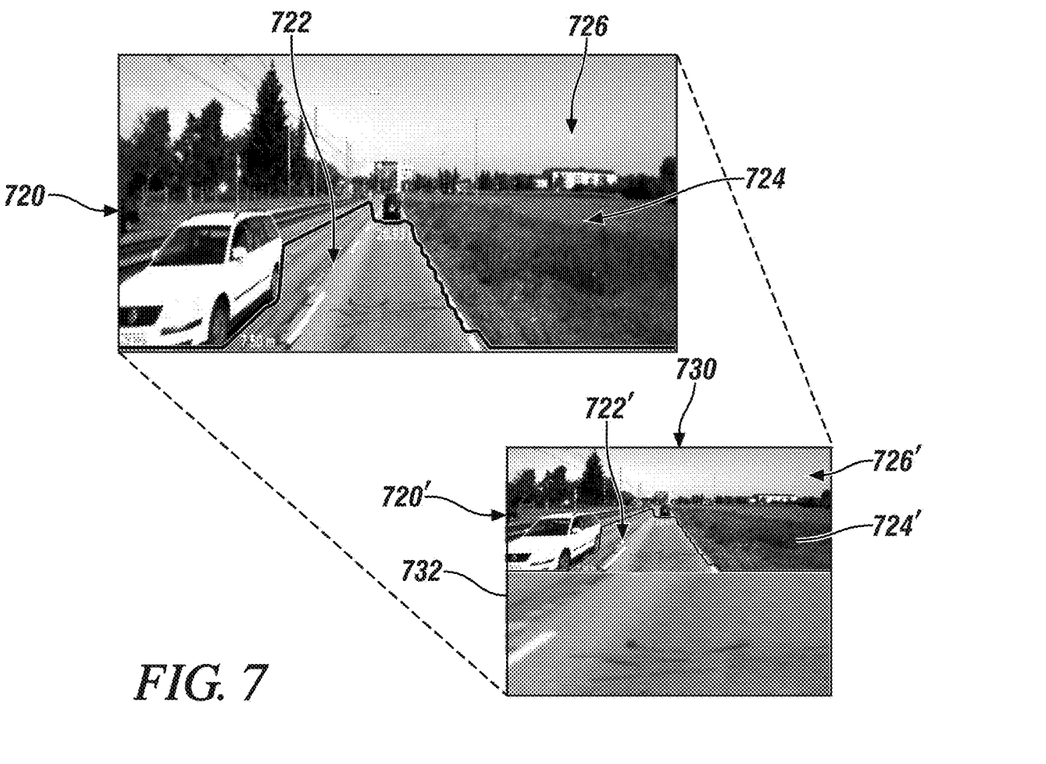
FIG. 7 illustrates an embodiment of the composite image datafile described with reference to FIG. 2, including a plurality of regions of interest associated with portions of a FOV of a single camera that include the vehicle travel surface, a surrounding environment and a portion of the sky that is forward of the vehicle, in accordance with the disclosure.

FIG. 7 pictorially illustrates an embodiment of images associated with an alternative embodiment of the travel surface identification process 100 that is described with reference to FIGS. 2 and 3 and is executed on the vehicle 10 described with reference to FIG. 1. This includes an original image 720 from one of the on-vehicle cameras 21 that is positioned to have a FOV that includes a portion that is forward of the vehicle 10. The original image 720 includes a travel surface 722, a surrounding environment 724, and a portion of the sky 726 that is forward of the vehicle 10. The sky 726 provides an indication of ambient lighting. The alternative embodiment of the travel surface identification process 100 includes compiling a composite image datafile by extracting, cropping, rotating and compressing portions of images that include the travel surface as captured by one of the on-vehicle cameras, specifically the one of the cameras having a forward FOV. As shown the composite image is indicated by element 730, and includes a region of interest associated with the forward FOV of the forward camera that includes the travel surface and the ambient lighting. The travel surface is in a dry state. The original image 720 can be captured by the camera having the forward FOV.

The composite image 730 includes a first image 720' and a second image 732. The first image 720' can be generated by cropping and/or scaling the first original image 720 such that a region of interest includes the travel surface 722' that is captured in the forward FOV, the surrounding environment 724' and the sky 726' to evaluate ambient lighting, which are portions of the original image 720 that has been subjected to cropping, data compression and other extraction techniques. In one embodiment, portions of the first image 720 that include vehicles, off-road portions, and other non-travel surface portions in the forward FOV may be removed to generate the second image 732. The second image 732 can be generated by cropping and scaling the first original image 720 such that a region of interest includes only the travel surface in the forward FOV that is immediately in front of the vehicle 10, e.g., within a predefined travel distance, such as with 25 feet of the front of the vehicle 10. This includes removing portions of the first image 720 that includes vehicles, off-road portions, and other non-travel surface portions.

The composite image 730 depicts a view of the travel surface 70 in front of the vehicle 10. The image analysis step 180 of the travel surface identification process 100 that is described with reference to FIGS. 2 and 3 can be advantageously executed to evaluate the composite image datafile that is associated with the composite image 730 to determine, in real-time, the travel surface state 190 by evaluating the first and second images 720' and 732.

In one embodiment, the original image 720 can be subjected to the image analysis process 150 described herein. As such the sky portion 726 provides an indication of ambient lighting, which can be integrated into the corresponding road image representation, which eliminates a need for a daytime model and a night-time model and negates a need for input from an ambient lighting sensor. Detection is further enhanced by employing analysis from the surrounding environment 724, such as being able to detect presence of snow on the road based upon the presence of snow in the surrounding environment, identifying a wet road condition, and detecting on-road environmental objects. Again, the image analysis process 150 may be based on image processing that includes hand-crafted feature analysis approach, which may include manually extracting features, then training of classifiers separately based on machine learning. Alternatively, a deep learning approach unifies the feature extraction process and the classification step through several layers of neural network. During training process, the parameters of neural network will be learned, and then in real time the real time image is fed into the trained neural network.

The instant appearance of the travel surface 70 can have a certain uniformity at different perspectives due to weather conditions. Combining the camera images at the various FOVs into one view of the travel surface 70 that surrounds the vehicle 10 can provide a more complete perspective of the travel surface 70 than an image from a single camera, which may be influenced by local noise such as shadows and reflected light. Furthermore, images from the FOV of side-view and rear-view cameras can provide features in addition to those that are generated from a front-view camera alone. As such the assembled image provides a more complete picture of overall road condition environment, which serves to alleviating road noise captured from a single camera (such as vehicle shadow). There is also facilitated an enhanced image analysis result, including feature learning and feature classification, as four unrelated local images become relevant and correlated for better feature learning. Furthermore, the assembled image scene permits context relevance among individual image scenes for improved feature learning and classification. The composite image analysis can simplify data processing and algorithm development, as data labeling and training can be done in one process instead of four more, and a single algorithm framework can be employed instead of four more algorithms with development of an additional fusion algorithm. When implemented on an embodiment of the vehicle 10 having autonomous functionality, the results from the travel surface identification process 100 can be employed by the autonomous controller 65 to autonomously actuate vehicle braking for mitigating condensation build-up on vehicle brakes. Furthermore the results from the travel surface identification process 100 can be employed by the autonomous controller 65 to autonomously actuate a traction control system for mitigating condensation build-up on vehicle brakes. Furthermore the results from the travel surface identification process 100 can be communicated via a wireless communication system for alerting other vehicles of the surface condition. Furthermore the results from the travel surface identification process 100 can be employed by the autonomous controller 65 and the HMI device 60 to alert a driver of a potential reduced traction between vehicle tires and the path of travel surface, and alert a driver of the vehicle against a use of automated features, such as cruise control.

The block diagrams in the flow diagrams illustrate the architecture, functionality, and operation of possible implementations of systems, methods, and computer program products according to various embodiments of the present disclosure. In this regard, each block in the block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for evaluating a travel surface for a vehicle, the method comprising:
   capturing, via a plurality of on-vehicle cameras, a plurality of images associated with a plurality of fields of view ("FOVs") of the respective cameras, wherein at least a portion of each of the fields of view includes the travel surface and the sky;
   identifying corresponding regions of interest for the images, wherein each of the regions of interest is associated with the portion of the field of view ("FOV") of the respective camera that includes the travel surface and the sky;
   extracting portions of the images, wherein each extracted portion of the respective image is associated with the region of interest in the portion of the FOV of the respective camera that includes the travel surface, wherein extracting the portions of the images includes extracting the sky to provide an indication of ambient lighting;
   compiling the extracted portions of the images into a composite image datafile;
   executing, via a controller, an image analysis of the composite image datafile based upon the indication of ambient lighting, including executing a statistical analysis, a template matching, and a color/brightness analysis of the composite image datafile to identify patterns that correlate to one of a plurality of travel surface conditions;
   determining a travel surface state based upon the image analysis of the composite image datafile; and
   communicating the travel surface state to an on-vehicle controller.

2. The method of claim 1, wherein the composite image datafile comprises a composite image that includes the travel surface that surrounds the vehicle.

3. The method of claim 2, wherein the composite image that includes the travel surface that surrounds the vehicle include a first portion associated with the travel surface in front of the vehicle, a second portion associated with the travel surface rearward of the vehicle, a third portion associated with the travel surface at a left side of the vehicle and a fourth portion associated with the travel surface at a right side of the vehicle.

4. The method of claim 1, wherein determining the travel surface state comprises determining one of a dry state, a wet state, an iced state and a snow-covered state.

5. The method of claim 1, wherein determining the travel surface state based upon the image analysis of the composite image datafile comprises:
   comparing results of the image analysis of the composite image datafile with the plurality of travel surface conditions; and
   classifying, via the controller, the travel surface state based upon the compared results of the image analysis.

6. The method of claim 5, wherein classifying the travel surface state comprises determining the travel surface state to be one of a dry state, a wet state, an iced state and a snow-covered state.

7. The method of claim 1, wherein capturing, via a plurality of on-vehicle cameras, a plurality of images comprises capturing a plurality of image files, wherein each of the image files comprises a digital representation of the FOV of the respective on-vehicle camera at its original resolution.

8. The method of claim 1, wherein the plurality of fields of view includes the travel surface comprises wherein at least a portion of each of the plurality of fields of view includes the travel surface.

9. The method of claim 1, wherein extracting portions of the images includes cropping the respective image to include the portion of the FOV of the respective camera that includes the travel surface.

10. The method of claim 1, wherein extracting portions of the images includes one of scaling, rotating and compressing the region of interest of the respective image in the portion of the FOV of the respective camera that includes the travel surface.

11. The method of claim 1, wherein capturing, via a plurality of on-vehicle cameras, a plurality of images associated with a plurality of fields of view of the respective cameras comprises simultaneously capturing the plurality of images.

12. The method of claim 1, wherein determining the travel surface state based upon the image analysis of the composite image datafile comprises determining the travel surface state based upon the correlation to one of the plurality of travel surface conditions.

13. A vehicle disposed on a travel surface, comprising:
   a vision system, including:
      a plurality of on-vehicle cameras disposed to monitor a corresponding plurality of fields-of-view surrounding the vehicle including the sky,
      a first controller operatively connected to the on-vehicle cameras and in communication with a second controller, the first controller including a first instruction set, the first instruction set executable to:
      capture, via the on-vehicle cameras, a plurality of images associated with a plurality of fields of view of the respective cameras, wherein at least a portion of each of the fields of view includes the travel surface and the sky;
      identify corresponding regions of interest for the images, wherein each of the regions of interest is associated with the portion of the field of view ("FOV") of the respective camera that includes the travel surface and the sky;
      extract portions of the images, wherein each extracted portion of the respective image is associated with the region of interest in the portion of the FOV of the respective camera that includes the travel surface and the sky, wherein the sky provides an indication of ambient lighting;
      compile the extracted portions of the images into a composite image datafile;
      execute an image analysis of the composite image datafile based upon the indication of ambient lighting, including executing a statistical analysis, a template matching, and a color/brightness analysis of the composite image datafile to identify patterns that correlate to one of a plurality of travel surface conditions;
      determine a travel surface state based upon the image analysis of the composite image datafile; and
      communicate the travel surface state to the second controller.

14. The vehicle of claim 13, wherein the second controller is operatively connected to a device configured to execute a vehicle function, the second controller including a second instruction set, the second instruction set executable to:
   monitor the travel surface state communicated from the first controller; and control the device configured to execute the vehicle function based upon the travel surface state.

15. The vehicle of claim 14, wherein the device configured to execute the vehicle function comprises a device configured to execute an autonomous vehicle function, and wherein the second instruction set is executable to modify operation of the device based upon the travel surface state.

16. The vehicle of claim 13, wherein the second controller comprises a telematics controller in communication with the first controller, wherein the telematics controller is disposed to communicate the travel surface state to an off-board controller via a communication network.

17. The vehicle of claim 13, wherein the second controller comprises a telematics controller in communication with the first controller, wherein the telematics controller is disposed to communicate the travel surface state to a second proximal vehicle and to an infrastructure monitoring system.

\* \* \* \* \*